United States Patent [19]

Wildner

[11] Patent Number: 4,776,955
[45] Date of Patent: Oct. 11, 1988

[54] PRESS WALL FOR A FILTER ELEMENT OF A FILTER PRESS

[75] Inventor: Gerhard Wildner, Nersingen, Fed. Rep. of Germany

[73] Assignee: Lenser Verwaltungs- GmbH, Senden, Fed. Rep. of Germany

[21] Appl. No.: 79,823

[22] Filed: Jul. 30, 1987

[30] Foreign Application Priority Data

Sep. 27, 1986 [DE] Fed. Rep. of Germany ....... 3632932

[51] Int. Cl.$^4$ ............................................. B01D 25/12
[52] U.S. Cl. ..................................... 210/228; 100/115; 100/211; 100/295; 210/229; 210/231
[58] Field of Search .............. 210/224, 227, 228, 229, 210/231, 445; 100/113, 115, 199, 211, 295

[56] References Cited

FOREIGN PATENT DOCUMENTS 2712753 9/1978 Fed. Rep. of Germany ...... 210/231
3220487 12/1983 Fed. Rep. of Germany .

Primary Examiner—Richard V. Fisher
Assistant Examiner—W. Gary Jones
Attorney, Agent, or Firm—Herbert Dubno

[57] ABSTRACT

The press wall is provided for a filter element of a filter press comprising a plurality of filter elements clamped together edgewise forming filter chambers for the suspension to be filtered. A filter element carries on one or both sides a press wall is attached edgewise with it which is movable by a pressurizing medium into the filter chamber. Each press wall has a plurality of sectional projections overlayed with a filter cloth on their wall surfaces directed toward the filter chamber which form a drainage system under the filter cloth. The press wall has an edge adjacent an edge region facilitating its connection to the filter element and a wall strip extending along this edge region. The wall strip is bendable at least to the extent of the displacement of the press wall under pressure. The side of the press wall directed away from the filter chamber is provided with a plurality of abutting pins in the vicinity of the wall strip which form a plurality of stop pieces bounding the displacement of the press wall.

4 Claims, 3 Drawing Sheets

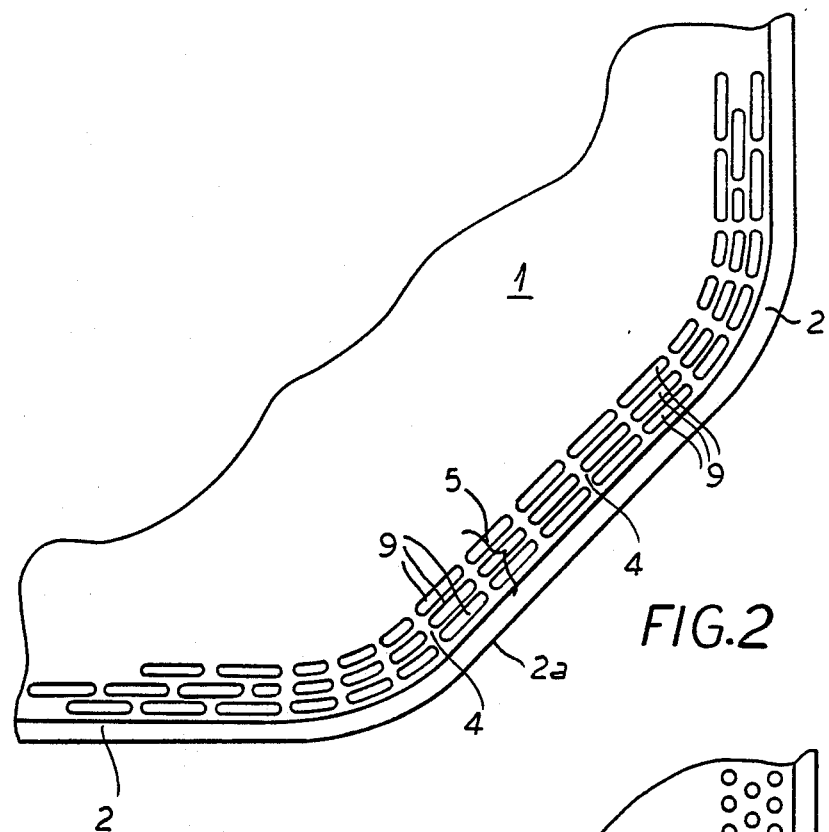
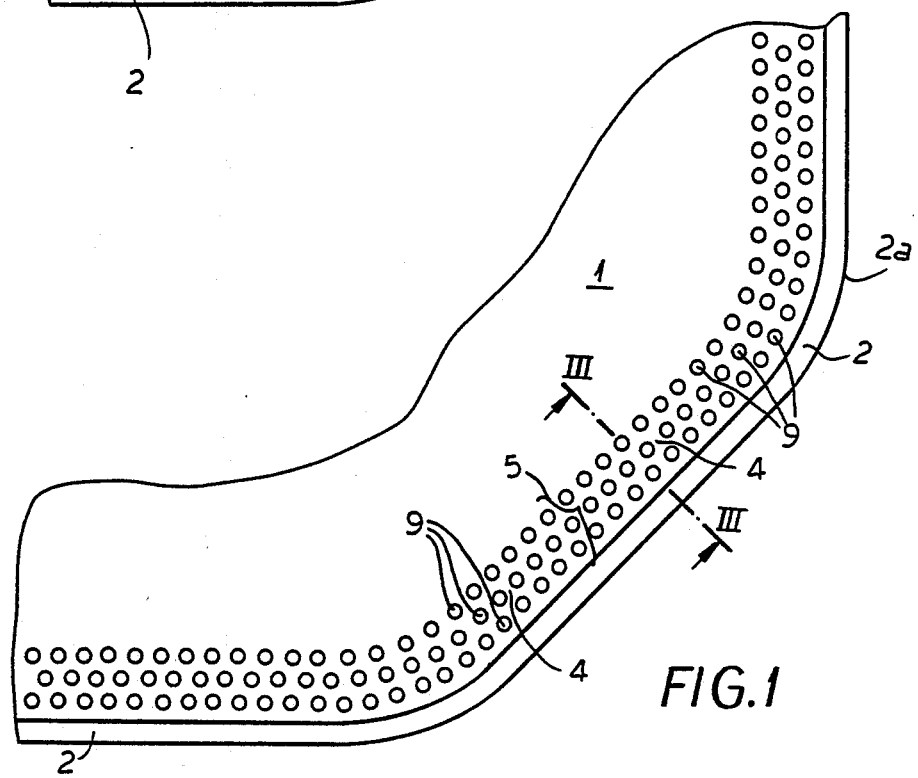
FIG. 2
FIG. 1

4,776,955

PRESS WALL FOR A FILTER ELEMENT OF A FILTER PRESS

FIELD OF THE INVENTION

My present invention relates to a press wall for a filter element of a filter press.

BACKGROUND OF THE INVENTION

A filter press (German Open Application DE-OS No. 3220487) can comprise a plurality of filter elements clamped together edgewise to form filter chambers with inlets opening into them for the suspension to be filtered. A filter element can have a press wall associated with it on one or both sides edgewise which is or are movable by a pressurizing medium toward one of the filter chambers.

Each press wall has a plurality of sectional projections overlayed with a filter cloth on their wall surfaces directed toward the filter chamber which form a drainage system connected to an outlet beneath the filter cloth.

The press wall has an edge region facilitating its connection to the filter element and a wall strip extending along this edge region which is bendable at least upon the displacement of the press wall under pressure.

A press wall for a filter element of a filter press is described in the aforementioned German Open Patent Application No. 32 20 487 and is attached to a supporting wall with its side facing away from the filter cloth chiefly with the edge region to a supporting wall.

To keep the load on the press wall due to displacement under pressure within certain limits in the vicinity of the wall strip so that damage particularly in the form of tears in the press wall does not occur, the supporting wall is fitted to the form of the press wall contacting it and follows a course inclined to the unloaded press wall in the vicinity of the wall strip.

When the supporting wall, as is usually the case, is formed by a planar plate and is bonded to the periphery of the press wall, the profiling required in the vicinity of the wall strip makes machinery of the supporting wall necessary. Moreover the region of the wall strip connected to the flange of the suspension inlet is exposed to a considerable strain since corresponding deformations on account of the flange rigidly opposing the displacement of the press wall occur as in the edge region.

OBJECTS OF THE INVENTION

It is an object of my invention to provide an improved press wall for a filter element of a filter press which obviates these drawbacks.

It is also an object of my invention to provide an improved press wall for a filter element of a filter press in which damage to the press wall in the vicinity of the wall strip as a result of loading due to displacement of the press wall by a pressurizing medium is avoided.

It is another object of my invention to provide an improved press wall for a filter element of a filter press in which a special shape for the supporting wall of the press wall is no longer required to avoid tears in the press wall.

SUMMARY OF THE INVENTION

These objects and others which will become more readily apparent hereinafter are attained in accordance with my invention in a press wall for a filter element of a filter press comprising a plurality of filter elements clamped together edgewise forming filter chambers for the suspension to be filtered.

The filter element has a press wall on one or both sides of the filter element attached edgewise to the filter element which is or are movable by a pressurizing medium into the filter chamber.

Each press wall has a plurality of sectional projections overlayed with a filter cloth on their wall surfaces directed toward the filter chamber which form a drainage system connected to an outlet under the filter cloth.

The press wall has an edge adjacent an edge region facilitating its connection to the filter element and a wall strip extending along this edge region which is bendable at least to the extent of the displacement of the press wall under pressure.

According to my invention the side of the press wall directed away from the filter chamber is provided with a plurality of abutting pins or studs (protuberances) in the vicinity of the wall strip which form a plurality of stop pieces bounding the displacement of the press wall.

The invention prevents excessive deformation of the wall strip of the press wall because of the displacement of the press wall under pressure. More particularly, the abutting protuberances are provided on the press wall during manufacture. Thus additional reworking or processing steps (machining steps) are no longer required for the supporting wall so that it can be formed from a suitably cut planar plate material.

To guarantee an inward movability of the press wall in the vicinity of the wall strip, the abutting protuberances or protuberances can be advantageously formed with a circular cross section.

However they can also have an elongate cross section whose length is at least twice as large as its width. Furthermore these latter abutting protuberances can be oriented parallel to the edge of the press wall.

It has also been found to be advantageous when the abutting protuberances or protuberances extend in the longitudinal direction of the wall strip and/or are arranged in successive parallel rows along the edge of the press wall since the inward mobility and deformability of the wall strip without damage is thereby guaranteed.

To incline the wall strip toward the supporting wall the height of the abutting protuberances can be reduced from the edge region of the press wall to the center of the filter chamber. Finally the abutting protuberances can be formed in one piece with the press wall so that the press wall can be provided simultaneously with abutting protuberances during its formation.

In summary then the press wall for a filter element of a filter press according to my invention bounds a filter chamber of the filter element. It comprises an edge and an adjacent edge region facilitating mounting on the filter element, a wall strip extending along the edge region and being bendable at least to the extent of the displacement of the press wall by a pressurizing medium, a plurality of sectional projections directed toward the filter chamber which form a drainage system, and a plurality of abutting protuberances in the vicinity of the wall strip advantageously arranged in successive rows parallel with each other running along the edge of the press wall provided on the side of the press wall directed away from the filter chamber and forming a plurality of stop pieces bounding the displacement of the press wall. The height of the abutting protuberances can advantageously decrease from the edge region of the press wall to the center of the press wall.

BRIEF DESCRIPTION OF THE DRAWING

The above and other objects, features and advantages of my invention will become more readily apparent from the following description, reference being made to the accompanying highly diagrammatic drawing in which:

FIG. 1 is a fragmentary top plan view of a press wall for a filtration element according to my invention;

FIG. 2 is a fragmentary top plan view of a second example of a press wall for a filtration element according to my invention;

SPECIFIC DESCRIPTION

Figure 3:
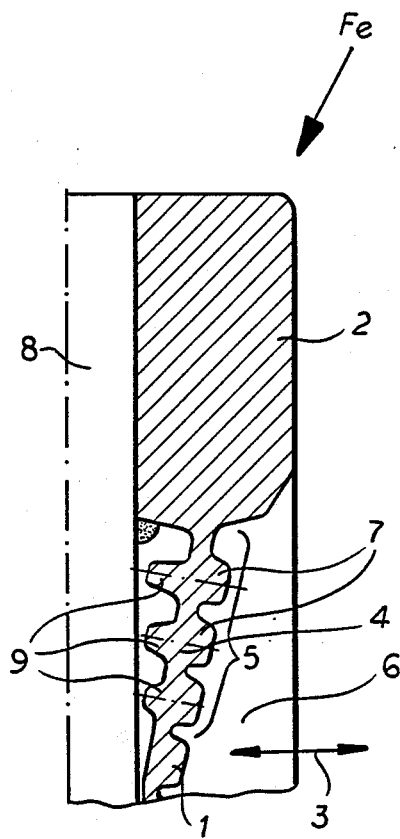
FIG. 3 is a cross sectional view taken along the section line III—III of FIG. 1 also showing a supporting wall.

The press wall 1 for a platelike filtration element Fe of a filter press shown in the drawing has a continuous edge region 2 tightly sealable against an adjacent filter element Fe and a bendable wall strip 4 inwardly of the edge region allowing a displacement of the press wall 1 under pressure occurring primarily in the direction of the double arrows 3 (FIG. 3) and running along the edge region 2.

The width of this wall strip 4 is shown by the bracket represented at 5. The wall surface facing the filter chamber 6 of the filter press in the assembled state is provided with sectional projections 7 which support a filter cloth Fc. These sectional projections 7 form a drainage system for the filtrate flowing through the filter cloth from the filter chamber 6. An outlet 20 is provided for the filtrate which is collected in channels 21.

Figure 4:
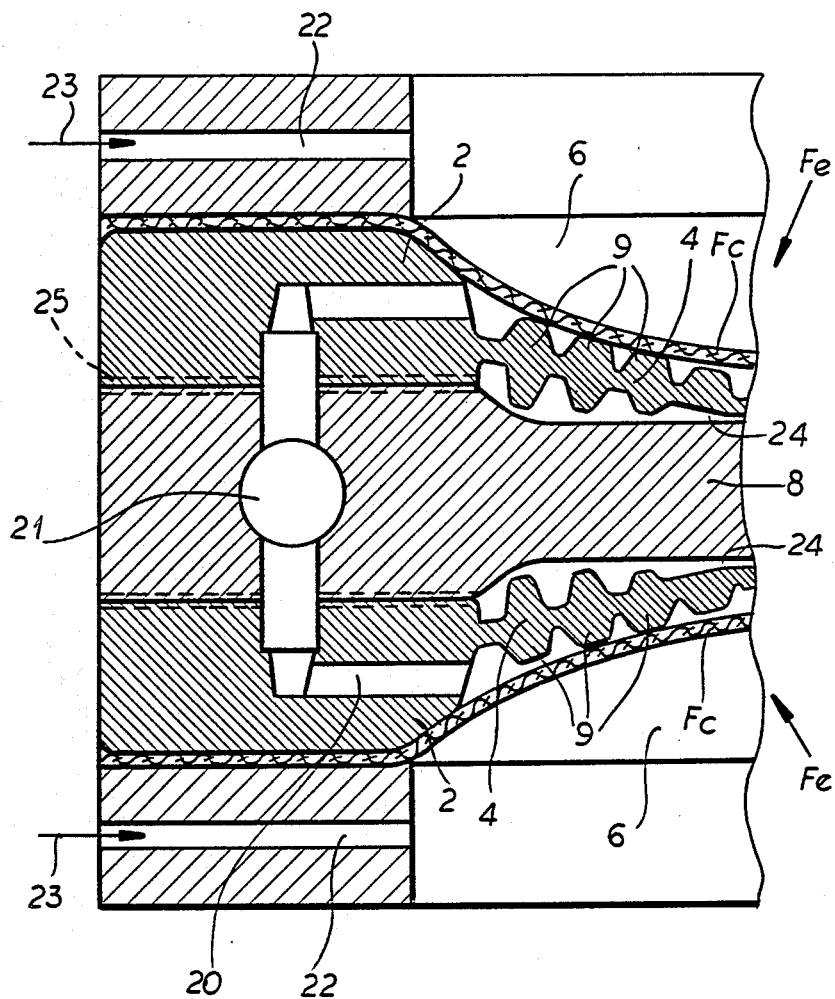
FIG. 4 is a cross sectional view through a filter press according to my invention.

The edge region 2 is a rigid plate border which contacts on a rigid supporting wall 8 on its side facing away from the filter chamber 6 and is attached rigidly with it (e.g. by welding in the embodiment of FIG. 4 or by making it integral with the support wall as in FIG. 3).

On its side facing away from the filter chamber 6, the press wall 1 is provided with a plurality of abutting protuberances 9 near the wall strip 4 which are stop pieces limiting the displacement of the wall strip 4 under pressure. The load which would otherwise occur there and the damage occurring because of that is avoided by limiting the displacement of the press wall 1 in the vicinity of the wall strip 4.

The abutting protuberances 9 can have a circular cross section according to FIG. 1 or they can have an elongate cross section of a length twice its width as in FIG. 2. In the case of FIG. 2 the long sides of the cross section of the abutting protuberances 9 are parallel to the edge 2a of the press wall 1.

In every case the abutting protuberances 9 in successive parallel rows positioned next to each other run in the longitudinal direction of the wall strip 4 and/or the edge 2a of the press wall 1 to attain an optimum and uniform support. The height of the abutting protuberances 9 is reduced from the edge region 2 of the press wall 1 to the center of the filter chamber 6 or the press wall 1 so that the press wall 1 approaches the supporting wall continuously in the vicinity of the wall strip 4.

The abutting protuberances 9 can be formed in a single piece with the press wall 1 and can be produced in the same working or shaping operation which forms the projections 7. Any machining of the supporting wall 8 can be eliminated or is not necessary and an appropriately cut planar plate material can be used for this plate.

From FIG. 4, it can be seen that inlets 22 served by channels 23 deliver the suspension to the chambers 6. The clamping means holding the filter elements together can be tie bolts (not shown). The compartment 24 between the support walls 8 and the respective movable walls 4 are pressurized via passages 25.

I claim:

1. In a press wall for a filter element of a filter press comprising a plurality of said filter elements clamped together edgewise forming a plurality of filter chambers for a suspension to be filtered, at least one of said filter elements having one of said press walls attached edgewise on one or both sides of said filter element which is or are movable by a pressurizing medium in one of said filter chambers, said press wall having a central region with a plurality of sectional projections unitary with said press wall and overlayed with a filter cloth on the wall surfaces of said press wall directed toward said filter chamber which form a drainage system under said filter cloth, said press wall having a continuous thick edge axially all around the periphery of the press wall and an adjacent edge region facilitating mounting on said filter element and a wall strip extending along said edge region and being bendable at least to the extent of the displacement of said press wall under pressure by said pressurizing medium, the improvement wherein the wall strip has a solid central web of the material of said press wall and the side of said press wall directed away from said filter chamber is provided with means for preventing excessive deformation of the wall strip including a plurality of solid abutting protuberances unitary with said web in the vicinity of said wall strip which form a plurality of stop pieces bounding said displacement of said press wall, said abutting protuberances being spaced uniformly apart in successive rows running along said periphery of said wall strip.

2. The improvement according to claim 1 wherein said abutting protuberances have a circular cross section.

3. The improvement according to claim 1 wherein each of said abutting protuberances has a cross section whose length is at least twice as large as the width thereof and said abutting protuberances are oriented parallel to said edge of said press wall.

4. The improvement according to claim 1 wherein the height of said abutting protuberances decreases from said edge region of said press wall to the center of said press wall.

* * * * *